(12) United States Patent
Hong (10) Patent No.: US 8,042,337 B2
(45) Date of Patent: Oct. 25, 2011

(54) METHOD AND APPARATUS FOR SOLAR TRACKING AND ENERGY COLLECTION

(76) Inventor: Jeong-Ho Hong, Daegu (KR)

( * ) Notice: Subject to any disclaimer, the term of this patent is extended or adjusted under 35 U.S.C. 154(b) by 622 days.

(21) Appl. No.: 12/091,398

(22) PCT Filed: Oct. 23, 2006

(86) PCT No.: PCT/KR2006/004336
§ 371 (c)(1),
(2), (4) Date: Apr. 24, 2008

(87) PCT Pub. No.: WO2007/049879
PCT Pub. Date: May 3, 2007

(65) Prior Publication Data
US 2008/0283043 A1    Nov. 20, 2008

(51) Int. Cl.
*F03G 6/00* (2006.01)

(52) U.S. Cl. .............. 60/641.11; 60/641.15; 123/577; 123/593

(58) Field of Classification Search .... 60/641.8–641.15; 126/572, 573, 576, 577, 593
See application file for complete search history.

(56) References Cited

U.S. PATENT DOCUMENTS

| | | | | |
|---|---|---|---|---|
| 4,079,591 A | * | 3/1978 | Derby et al. ................. | 60/641.8 |
| 4,213,303 A | * | 7/1980 | Lane .......................... | 60/641.15 |
| 4,242,580 A | * | 12/1980 | Kaplow et al. ............. | 250/203.4 |
| 4,244,189 A | * | 1/1981 | Bliamptis ................... | 60/641.11 |
| 4,286,579 A | * | 9/1981 | Johnston ..................... | 126/694 |
| 4,676,068 A | * | 6/1987 | Funk ........................... | 60/641.14 |
| 4,832,002 A | * | 5/1989 | Medina ....................... | 126/577 |
| 5,512,742 A | | 4/1996 | Mattson | |

FOREIGN PATENT DOCUMENTS

| | | |
|---|---|---|
| JP | 08-510547 | 11/1996 |
| JP | 2005-090889 | 4/2005 |
| KR | 1020010010740 | 2/2001 |

* cited by examiner

*Primary Examiner* — Hoang Nguyen
(74) *Attorney, Agent, or Firm* — Park & Associates IP Law, P.C.

(57) ABSTRACT

This invention relates to the sun location tracking method and apparatus of solar heat or photovoltaic collectors which are composed of a solar heat comparison collector for tracing the sun, a solar heat collector for reverting the collectors to sunrise position, and a turbine driven instrument of differential gear for mechanical driving of the tracking system so the tracking is accomplished by itself, and a heat exchanger and a water tank are provided to improve efficiency. The sun location tracking is performed by kinetic force of the steam turbine which driven by the steam from the solar heat comparison collector that generating steam with the solar energy only, so the most solar heat or photovoltaic energy to be obtained at the collectors while tracking the sun location from sunrise to sunset as driving one or more solar heat or photovoltaic collector(s) with interlocking movement manner.

5 Claims, 9 Drawing Sheets

A1-A2 cross-section view

B1-B2 cross-section view

C1-C2 cross-section view

[Fig. 17]

D1-D2 cross-section view

C1 – C2 cross-section view

METHOD AND APPARATUS FOR SOLAR TRACKING AND ENERGY COLLECTION

TECHNICAL FIELD

The present invention relates to a method and an apparatus for solar tracking and energy collection, utilizing solar heat or photovoltaic collectors. More particularly, this invention relates to an improved process and apparatus which includes a solar heat comparison collector, a solar heat collector for returning to a sunrise direction, a differential gear of turbine driving system, a heat exchanger and a water (or liquid) tank, converting the thermal solar energy to a kinetic energy using the water (or liquid) as the solar heat medium and to lead to operation of one or more solar heat or photovoltaic collectors, enabling the heat or light collecting surfaces of the solar heat or photovoltaic collectors to face the sun by tracking the sun location from sunrise to sunset, and enabling the solar heat or photovoltaic collectors to track the sun location in order to collect the solar heat or photovoltaic energy at the maximum amount.

Currently, typical solar heat or photovoltaic collectors to use the solar energy are mainly fixed at an outside of a building or on the ground and thereby having the collecting surfaces of solar heat or photovoltaic collectors face the sky upright and south. At this occasion, the solar energy collected by solar heat or photovoltaic enemy is mainly obtained for 2 to 3 hours before and after midday. Generally, from sunrise to 10 a.m. and form 3 p.m. to sunset, the efficiency decreases because the solar energy collecting area of the solar heat or photovoltaic collectors decreases. An incident angle of 45° leads to a collecting efficiency of 30% and an incident angle of 60° leads to a collecting efficiency of below 50%.

Currently, solar location tracking apparatuses are partially used but most of these are tracking solar location by sensing sun location change, and using high cost sensor and electric motor for tracking. In addition, present conventional sun location tracking apparatus require electric power and complex structure, and commercialization is very difficult except the case for laboratory.

DISCLOSURE OF INVENTION

In order to solve the above mentioned problems, the invention provides tracking the sun location using only the solar heat energy which is converted to a thermal energy then to a kinetic energy by heating water only with the solar energy and generating a steam, and the kinetic energy of the steam is used to drive turbines which enable the solar heat or photovoltaic collectors to track the sun location.

In order to achieve the above mentioned purpose, the invention utilizes 2 sets of solar heat collectors, each with a reflector, to absorb the solar heat and efficiently heat water to a high temperature and to vaporize, thereby a volume expansion of vapor leads to an operation of turbine.

One set of the solar heat collectors is placed at sunset side and is named as a sun location tracking collector, and the other set is placed at sunrise side and is named as a solar location tracking control collector.

As such, the invention utilizes 2 sets of the same size solar heat collectors, each with reflector, for heating water (or liquid) to generate steam (or gas).

Then, the sun location tracking collector and the sun location tracking control collector are placed together as side by side and combined in parallel.

Then, a solar ray reflection and blocking rectangular plane is installed at the joint between the two solar heat collectors in vertical against the surface of aperture of the solar heat collectors, thus, completing the solar heat comparison collector.

Generally, a differential gear apparatus includes a ring gear fixed to a differential gear case, and both wheels of differential side gears are operated by rotation of the ring gear. In this invention, a sprocket is fixed instead of the ring gear and coupled to steam turbines to drive the differential gear.

The sun location tracking drive turbine and the sun location tracking drive control turbine are driven by exhaust steam which is proportional to the amount of receiving solar heat from the sun location tracking collector and the sun location tracking control collector in the solar heat comparison collector.

The rotation arms (14*b*) of the solar heat comparison collector and solar heat or photovoltaic collectors are moved to the direction of right or left by the differential gear that is driven by the sun location tracking drive turbine and the sun location tracking drive control turbine where the steam fed to.

The sun location tracking power is provided by coupling the axis of the sun location tracking drive turbine to the axis of one side of the differential side gear in the differential gear.

To provide an interlocking movement, the rotation arms of sun location tracking of the solar heat comparison collector and each of solar heat collectors or photovoltaic collectors are coupled to the sprocket fixed at the differential gear which is rotating along with turn difference between both drive turbines turns so the sun location tracking can be performed.

For returning the solar heat comparison collector and the solar heat or photovoltaic collectors, which are stopped and resting at sunset direction, to the sunrise direction with the sun location tracking drive control turbine that driven by the steam from the solar heat collector for returning to sunrise direction, which is the same size of the sun location tracking control collector, fix this returning collector to face sunrise direction and feed steam exhausted from the returning collector to the sun location tracking drive control turbine with hose in parallel with the steam exhaust from the sun location tracking drive control collector.

The sun location tracking drive turbine can be braked by installing the steam pressure brake device on the axis of the sun location tracking drive turbine to prevent its spin when the sun location tracking drive turbine is driven by the solar heat collector for returning to sunrise direction.

The drive control system is formed with the rotation arms of sun location tracking of the solar heat comparison collector and solar heat or photovoltaic collectors which are coupled to the sliding rod fixed at the moving rod so the rotation arms of sun location tracking can move right or left direction, and the screw type moving rod is coupled at end side of the moving rod to the female screw which is coupled to the sprocket, that is fixed at the differential gear case, with chain.

Also provided are a water tank for supplying water to the solar heat comparison collector and the solar heat collector for returning to sunrise direction, and the heat exchanger for preheating the water to be supplied to the solar heat collectors by exchanging heat with the water from drive turbines.

FIGURE NUMBERS

1: Solar heat comparison collector
2 Solar heat collector for returning to sunrise direction
3: Solar heat or photovoltaic collector
4: Instrument of differential gear
5: Double pipe heat exchanger
6: Water (or liquid) tank
1a: Sun location trace collector
1b: Sun location trace control collector
3a: The first solar heat or photovoltaic collector
3b: The second solar heat or photovoltaic collector
3n: The n th solar heat or photovoltaic collector
5a: Heat exchanger for the sun location trace collector
5b: Heat exchanger for the sun location trace control collector
11: Solar ray reflection and blocking panel
12: Frame of the solar heat comparison
13: Solar heat or photovoltaic collector support legs
14a: Rotation arm for sun location trace fixing rod
14b: Rotation arm of sun location tracing
15a: Heat collection water tube of the sun location trace collector
15b: Heat collection water tube of the sun location trace control collector
15c: Heat collection water tube of the solar heat collector for returning to sunrise direction
16: The tempered glass cover of cylindrical parabolic reflector of the solar heat collector
17: The side wall of cylindrical parabolic reflector of the solar heat collector
18: Cylindrical parabolic reflector
19a: Supporting rod of the sun location trace collector
19b: Supporting rod of the solar location trace control collector
19c: Supporting rod of the solar heat collector for returning to sunrise direction
21: Frame for the solar heat collector for returning to sunrise direction
22: The aperture direction fixing rod of the solar heat collector for returning to sunrise direction
31: Solar heat or photovoltaic collector frame
32: Solar heat or photovoltaic collector supporting rod
40: Steam pressure brake device
41: Differential gear case
42: Differential pinion gear
43: Differential pinion gear bearing axis
44a: Differential side gear of the sun location trace drive turbine
44b: Differential side gear of the sun location trace drive control turbine
45a: Turbine axis of the sun location trace drive turbine
45b: Turbine axis of the sun location trace drive control turbine
46a: Sun location trace drive turbine
46b: Sun location trace drive control turbine
47: Sprocket of differential gear
48: Sprocket with female screw hole
49: The movement screw guide ring
51: The inner tube inlet of the double pipe heat exchanger
52: The inner tube outlet of the double pipe heat exchanger
53: The outer tube inlet of the double pipe heat exchanger
54: The outer tube outlet of the double pipe heat exchanger
55: The inside pipe of the double pipe heat exchanger
56: The outside pipe of the double pipe heat exchanger
61: Refilling inlet of water (or liquid)
62: Outlet for water (or liquid)
63: Return water (or liquid) inlet
70: Fixing rod of the sun location trace system
71: A driving screw
72: The sun location trace driving rod
73: The rotation arm sliding connector
74: The guide ring of the driving rod
75: The guide ring fixing for moving bar
101: Rotation axis bearing for solar-heat or photovoltaic collector
102: Rotation axis solar heat or photovoltaic collector
103: Internal rotation slide nut
104,105,106,107,205,206,407,501,502: Check valves
111,113,211,403,405,503,504,505,601,602,603: Water (or liquid) hoses
112,114,212,404,406,408: Steam (or gas) hoses
203: The aperture upper fixing nut of the solar-heat collector for returning to sunrise direction
204: The aperture bottom fixing nut of the solar heat collector for returning to sunrise direction
401: Slide ring
402: Chain for sprocket
S: Solar heat or photovoltaic irradiation direction
S1: Solar heat irradiation quantity of the sun location trace collector
S2: Solar heat irradiation quantity of the sun location trace control collector
SR: A sunrise direction
SS: A sunset direction

BEST MODE FOR CARRYING OUT THE INVENTION

In the primary constituent of the present invention, solar heat collector heating to high temperature contains many kinds such as cylindered parabolic mirror solar heat collector commonly used, PTC solar heat collector and CPC solar heat collector. However, for convenience sake, cylindrical parabolic reflector for solar heat collector (1a,1b,2) are used for convenience.

Figure 1:
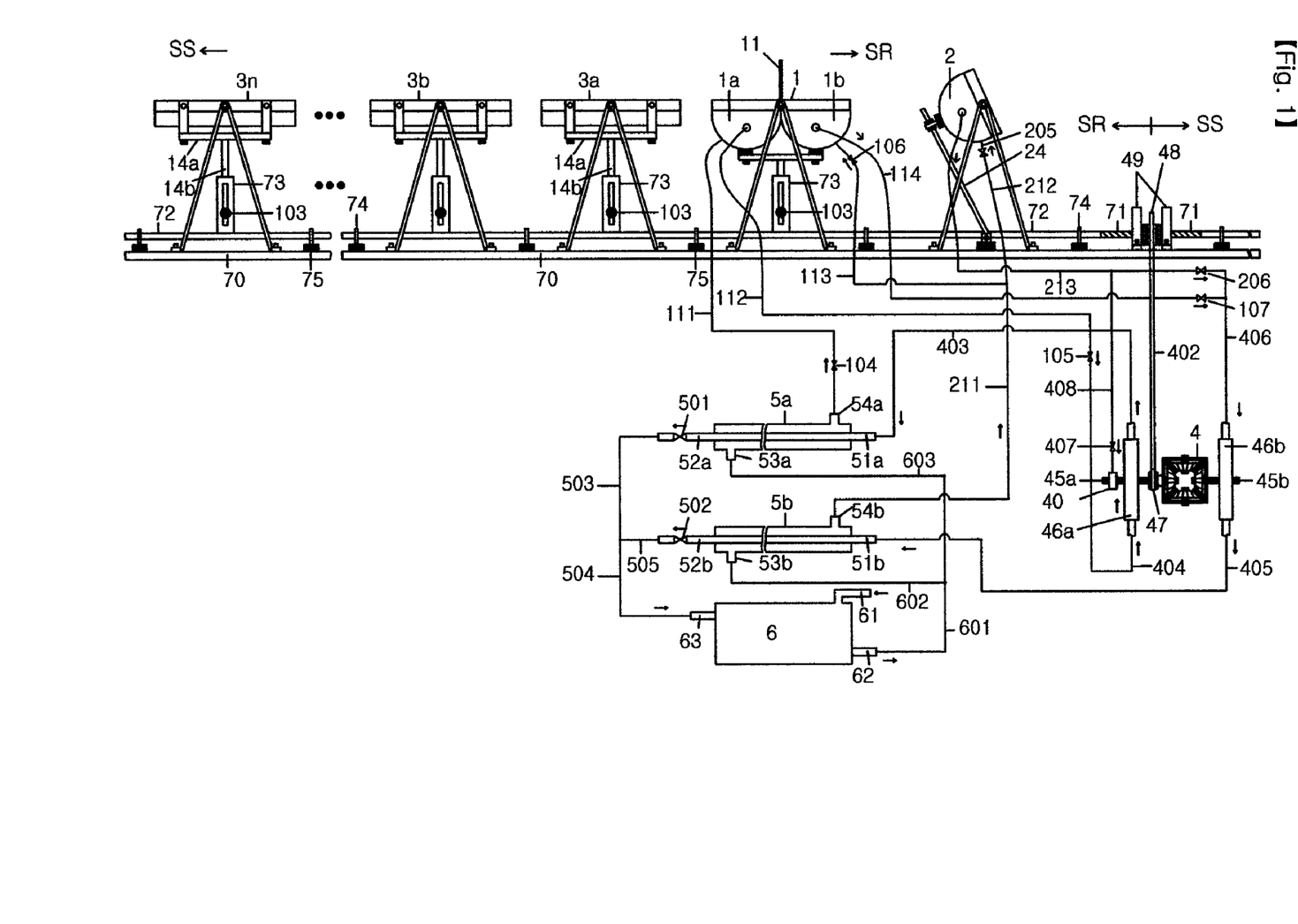
FIG. 1 is an elementary construction view of solar location tracking system of solar heat or photovoltaic collector

The invention, as shown in FIG. 1, is consisted of the solar heat comparison collector (1), the solar heat collector for returning to sunrise direction (2), the solar heat or photovoltaic collector (s) (3a,3b,3n), the differential gear of driving turbine system (4), the driving control system, the heat exchanger (5a,5b) and water tank (6), heating water with solar heat, operate solar heat or photovoltaic collectors (3a, 3b,3n) one or more, tracking the sun from sunrise to sunset and leads to collection of solar-heat or photovoltaic.

Solar heat collector which is chosen for convenience sake is the solar heat collector for returning to sunrise direction (2), the solar heat comparison collector (1) consist of the sun location trace collector (1a) and the sun location trace control collector (1b). These solar heat collectors contains cylindrical parabolic reflector (18) and heat collection water tube (15a, 15b, 15c) absorbing solar heat is located at focusing axis of the parabolic reflector, at cylindrical parabolic reflector (18) aperture face, the short wave length of infrared light are passed through and the long wave length of infrared light from radiant heat is blocked not to pass through outwards so the heat is concentrated in the heat collector.

Comprising two sets of solar heat collectors where water is supplied to the solar heat collectors (1a, 1b) as mentioned above and heating water with solar heat causes the transformation of water to vapor, and thereby volume expansion of vapor leads to a rotation of turbine. In this manner, one of the two sets of solar heat collectors is arranged towards sunset and named the sun location trace collector (1a), the other one is arranged towards sunrise and named the sun location trace control collector (1b), and these two heat collectors (1a,1b) are arranged parallel as a solar heat comparison collector (1).

At the joint interface of the two solar heat collectors, the solar ray reflection and blocking plate (11) shaped flat and rectangular is arranged perpendicular to aperture face of solar heat collector (1a,1b). As mentioned in above, comprising the solar heat comparison heat collector (1) which is formed to compare the dosage difference between the sun location trace collector (1a) and the sun location trace control collector (1b), At the turbine axis of the sun location trace drive turbine (45a) of the differential side gear of the sun location trace drive turbine (44a) of the instrument of differential gear (4), the rotation axis of turbine is coupled so the sun location trace drive turbine (46a) to rotate clockwise.

At the axis of the other side of differential side gear (44b), couple the sun location trace drive control turbine (46b) so it rotate counter-clockwise to drive the differential side gear of the sun location trace control drive turbine (44b) of the instrument of differential gear (4), Compose the instrument of differential gear (4) which cause the sprocket of differential gear (47) fixed at differential gear case (41) to rotate to the same direction of rotation of turbine as much as the rotation difference between the sun location trace drive turbine (46a) and the sun location trace drive control turbine (46b) fixed at solar heat comparison collector (1) and the rotation arm for sun location trace fixing rod (14a) of each solar heat collector (3a,3b,3n), the rotation arm of solar location tracing (14b) is connected to the rotation arm sliding connector (73) fixed at the sun location trace driving rod to rotate the rotation arm of sun location tracing (14b).

Figure 2:
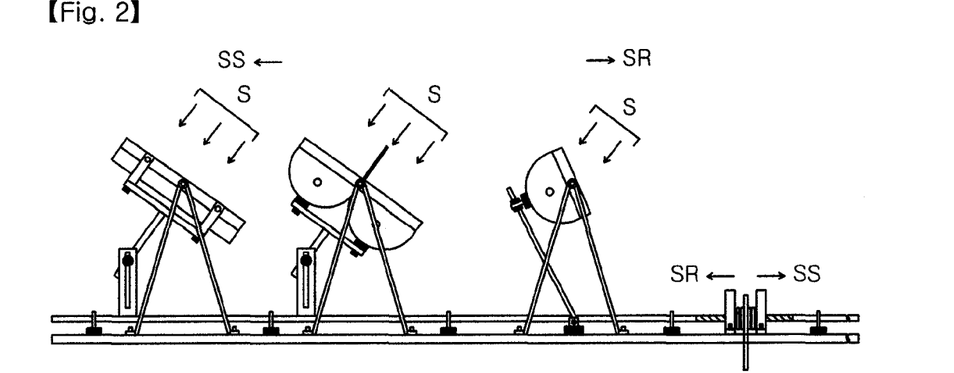
FIG. 2 is a drawing for position change of the rotation arm of sun location tracing when the solar location tracking system facing to up right direction.
Figure 3:
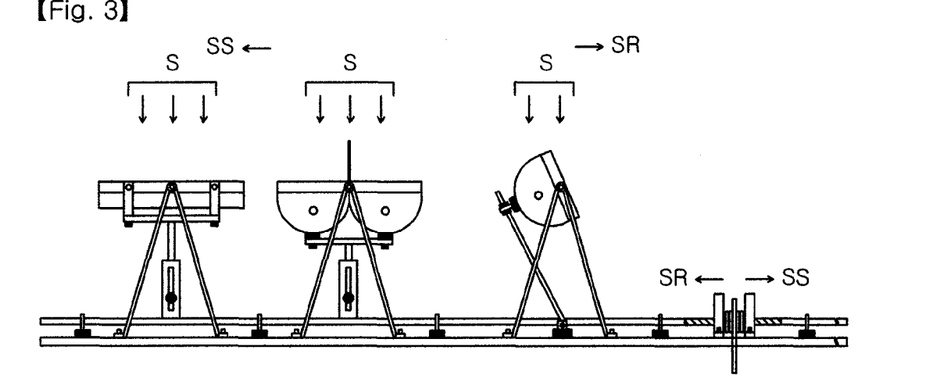
FIG. 3 is a drawing for position change of the rotation arm of sun location tracing when the solar location tracking system facing to sunrise direction.
Figure 4:
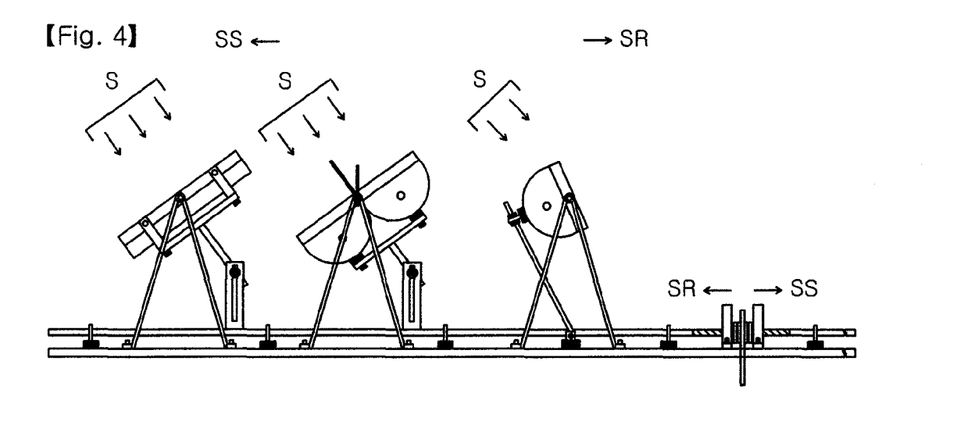
FIG. 4 is a drawing for position change of the rotation arm of sun location tracing when the solar location tracking system facing to sunset direction

At the end of the sun location trace driving rod (72), a driving screw (71), a sprocket with female screw hole (48), a differential gear case (41), a sprocket of differential gear (47) and chain (402), a differential gear case (41), a solar heat comparing collector (1), solar heat collectors (3a,3b,3n), the sun location tracing rotation arm (14b) (Ref. drawing 2, 3, 4) the rotation arm for sun location trace fixing rod (14a), the rotation arm of sun location tracing (14b), the sun location trace driving rod (72), the rotation arm sliding connector (73), and the sprocket with female screw hole (48) are composed.

The aperture face of the solar heat collector for returning to sunrise direction (2) is fixed to face the sunrise direction and outlet steam heated at the solar heat collector for returning to sunrise direction (2) is connected in a row to the sun location trace drive control turbine (46b), and this turbine is driven at sunrise and comprising the solar heat collector for returning to sunrise direction (2) which causes photovoltaic collector (3a,3b,3n) and the solar heat comparison collector (1) for reverting to the location of sunrise.

Comprising the steam pressure brake device (40) at the turbine axis of the sun location trace drive control turbine (45a) of the sun location trace drive turbine (46a) in order to prevent idling of the sun location trace drive control turbine (46b) due to the load in the instrument of the differential gear for driving turbine (4) of the sprocket of differential gear (47) when sun location trace drive control turbine (46b) is driven by the solar heat collector for returning to sunrise direction (2).

The solar heat comparing heat collector (1) and the solar heat collector for returning to sunrise direction (2) are heated, the water outlet after turbine driving, the heat of the water is exchanged and preheated at each solar heat collectors and the water is preheated which is supplied at heat exchanger (1a, 1b,1c) for enhancing heat efficiency and solar location tracking apparatus is arranged with heat exchanger (5a,5b) for enhancing heat efficiency and water tank (6).

The water and steam flow circuitry of the sun location trace drive turbine (46a) are formed by connecting water hoses (601,603,111) between the exhaust (62) of water tank (6) and the heat exchanger (5a), between the heat exchanger (5a) and the heat collector tube (15a) of the sun location trace solar heat collector (1a), and connecting the check valves (105, 501) between the heat collector tube (15a) and the heat exchanger (5a) to prevent reverse flow, by connecting the steam hoses (112,404,403,503,504) between the heat collector tube (15a) and the sun location trace drive turbine (46a), between the sun location trace drive turbine (46a) and the heat exchanger (5a), and between the heat exchanger (5a) and water tank (6) to drain distilled water, by connecting the check valves (105,501) between the heat collector tube (15a) and the sun location trace drive turbine (46a), and between the heat exchanger (5a) and the water tank (6) to prevent reverse flow.

The water and steam flow circuitry of the sun location trace drive control turbine (46b) those are formed by connecting the water hoses (601,602,211,113) between exhaust (62) of water tank (6) and the heat exchanger (5b), between the heat exchanger (5b) and the heat collector tube (15b) of the sun location trace control solar-heat collector (1b), and connecting check valve (106) between the heat collector tube (15b) and the heat exchanger (5b) to prevent reverse flow, by connecting the steam hoses (114,406,405,504) between the heat collector tube (15b) and the sun location trace drive control turbine (46b), between the sun location trace drive control turbine (46b) and the heat exchanger (5b), and between the heat exchanger (5b) and water tank (6) to drain distilled water, by connecting the check valves (107,502) between the heat collector tube (15b) and the sun location trace drive control turbine (46b), and between the heat exchanger (5b) and the water tank (6) to prevent reverse flow;

The water and steam flow circuitry of the sun location trace drive control turbine (46b) those are formed by connecting the water hoses (601,602,211,212) between exhaust (62) of water tank (6) and the heat exchanger (5b), between the heat exchanger (5b) and the heat collector tube (15c) of the solar heat collector for returning to sunrise direction (2), and connecting the check valve (205) between the heat collector tube (15b) and the heat exchanger (5b) to prevent reverse flow, by connecting the steam hoses (213,406,405,504) between the heat collector tube (15c) and the sun location trace drive control turbine (46b), between the sun location trace drive control turbine (46b) and the steam pressure braking device (40), between the steam pressure braking device (40) and the heat exchanger (5b), and between the heat exchanger (5b) and water tank (6) to drain distilled water, by connecting the hose (408) between the steam pressure braking device (40) and the heat collector tube (15c) via the check valve (407) to prevent reverse flow, by connecting the check valves (206,502) between the heat collector tube (15c) and the sun location trace drive control turbine (46b), and between the heat exchanger (5b) and the water tank (6) to prevent reverse flow.

Operation principle of the present invention is explained as follows:

Most of all, water tank (6) is supplied with water and water in every heat collection water tubes (15a,15b,15c) are filled. When the solar location tracking apparatus is arranged, water tank placed higher than heat collection water tubes lead to self-supply of water into every heat collection tubes.

Check the water tank is filled and make sure the aperture face direction fixing (22) rod of the solar heat collector for returning to sunrise direction (2) is fixed with the upper and bottom fixing nut (203,204) so the aperture face of the solar heat collector for returning to sunrise direction (2) to look at the sun at about 9 o'clock in the morning.

When the sun is rising in the morning at around 9 o'clock, the solar heat for returning to sunrise direction (2) is heated by solar heat energy, the water (or liquid) in the heat collection water tube (15c) by solar heat become steam, this steam are not exhaust to in draft direction of heat collection water tube (15) due to closed check valve (205), it supply to the sun location trace drive control turbine (46b) and steam pressure brake device (40) through the steam hoses (213,406,408) and check valve (206). At this time, the steam pressure brake device (40) can not control the sun location trace drive control turbine (46a) so it can not driving.

Figure 5:
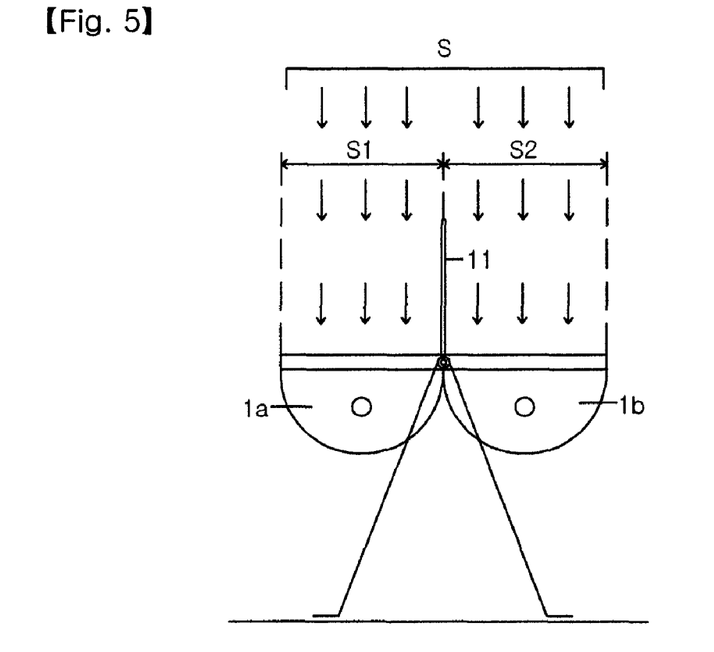
FIG. 5 is drawing for solar heat irradiation quantity indication when the aperture of the solar heat comparison collector facing right to the sun direction.
Figure 6:
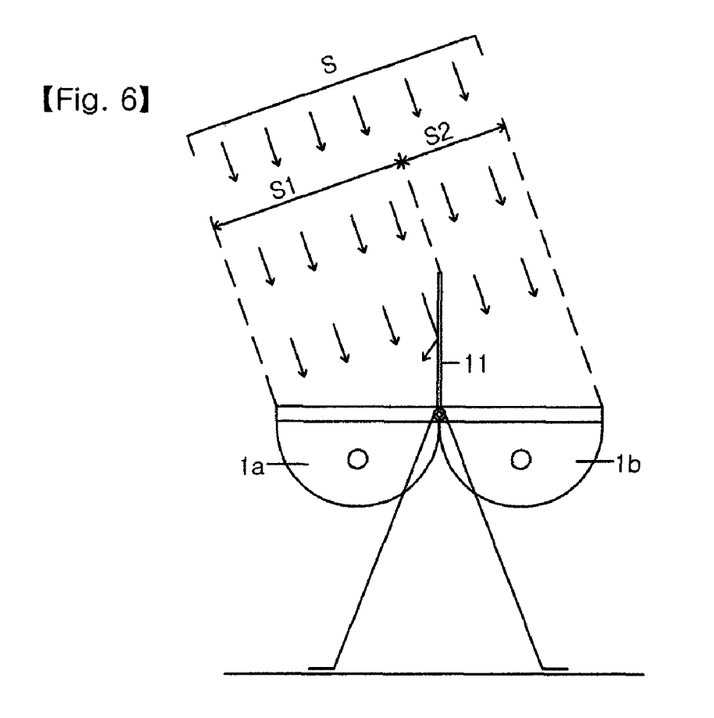
FIG. 6 is drawing for solar-heat irradiation quantity indication when the aperture of the solar heat comparison collector facing tilted to the sun direction.
Figure 7:
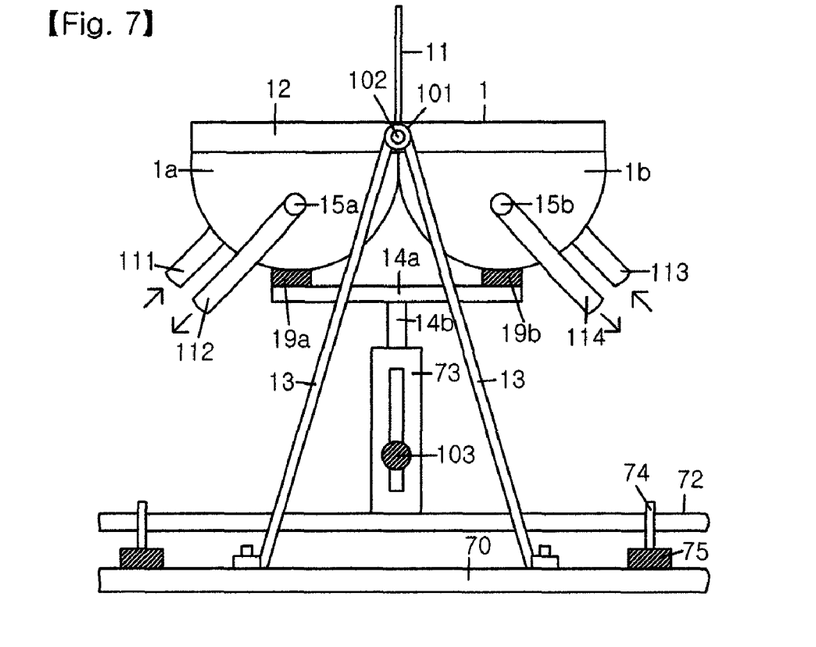
FIG. 7 is the front view of the solar heat comparison collector
Figure 8:
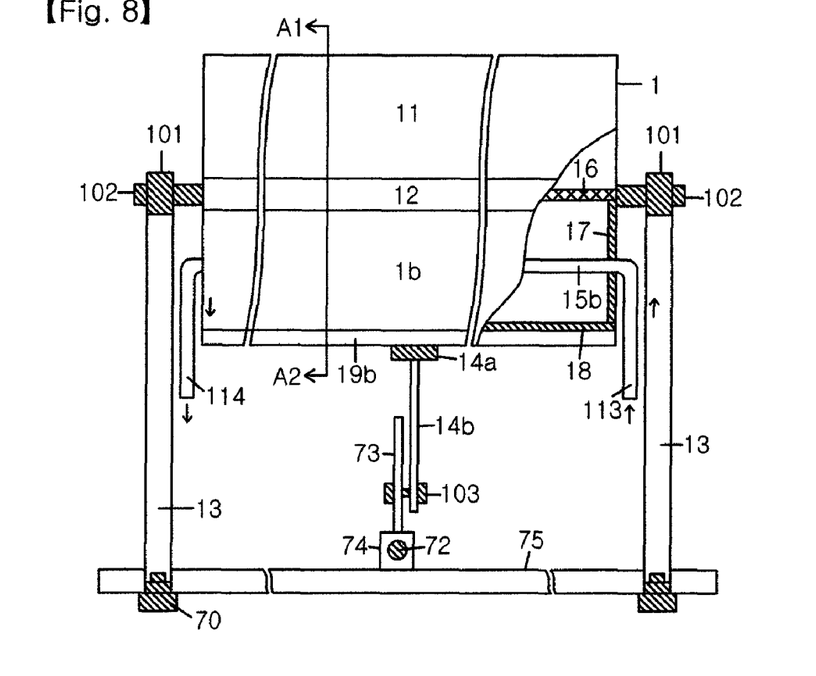
FIG. 8 is the side view of the solar-heat comparison collector
Figure 9:
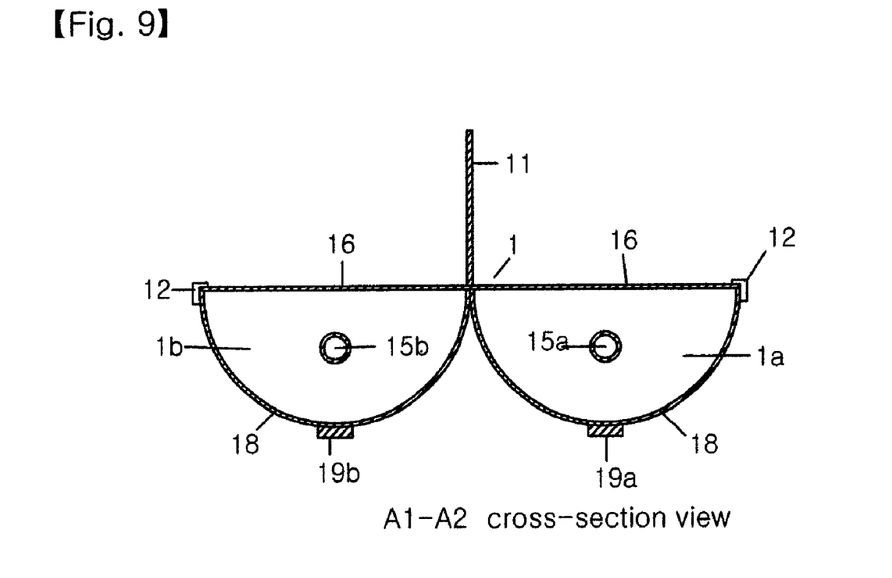
FIG. 9 is the cross-section view of the solar heat comparison collector (A1-A2)
Figure 10:
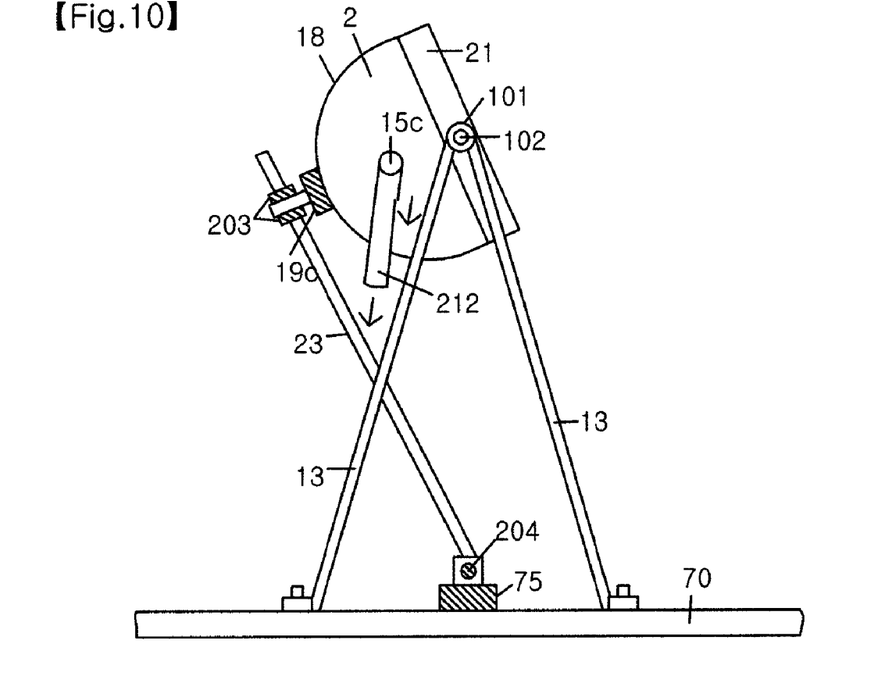
FIG. 10 is the front view of the solar heat collector for returning to sunrise direction.
Figure 11:
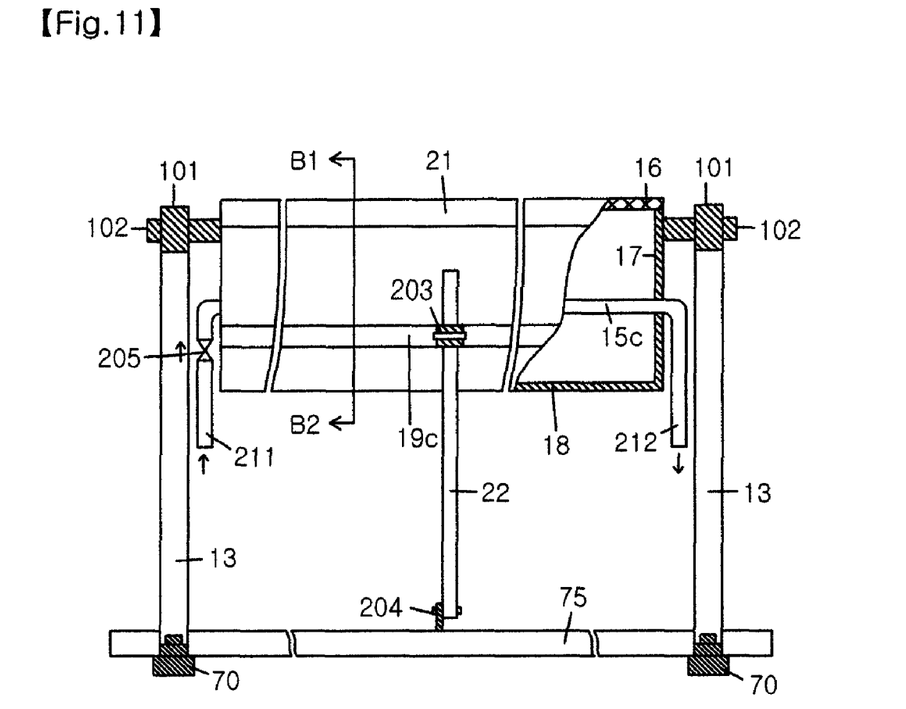
FIG. 11 is the side view of the solar heat collector for returning to sunrise direction.
Figure 12:
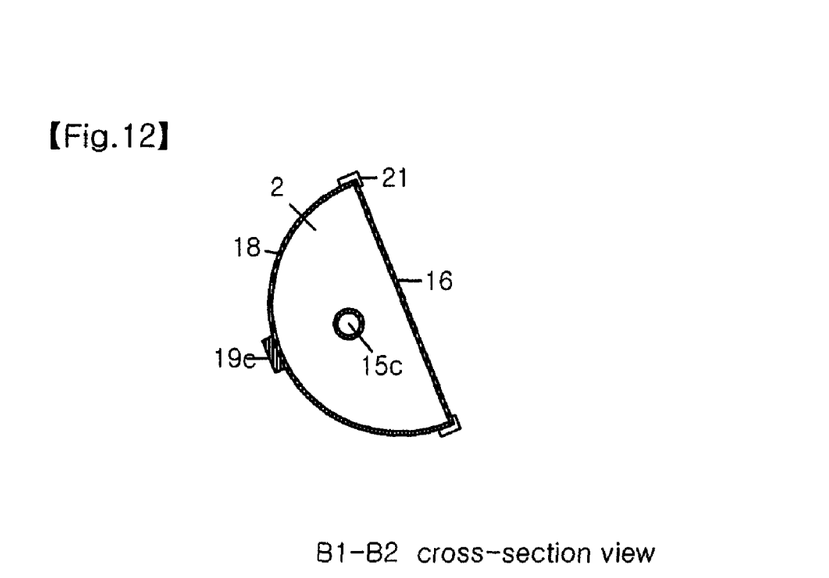
FIG. 12 is the cross-section view of the solar heat collector for returning to sunrise direction (B1-B2)
Figure 13:
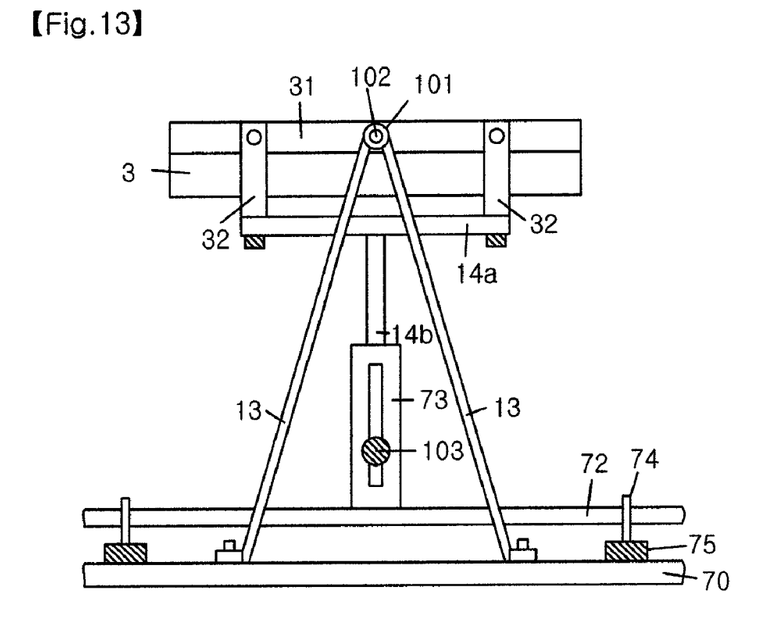
FIG. 13 is the front view of solar-heat or photovoltaic collector
Figure 14:
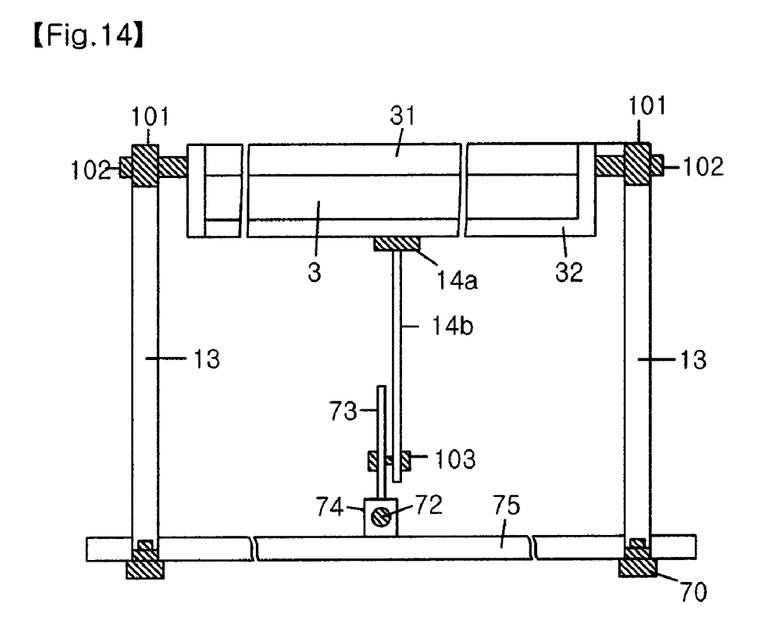
FIG. 14 is the side drawing of solar heat or photovoltaic collector

On the other side, the sun location trace drive control turbine (46b) does the driving and it rotate to a watch opposite direction, at once, the sprocket of differential gear (47) rotate to a watch opposite direction too. So, the sprocket with female screw hole (48) put in driving rod nut (71) of the sprocket of differential gear (47) connected with chain (402) which rotate to left screw direction, in this time, solar heat collector or photovoltaic collector (3a,3b,3n) and solar comparison heat collector (1) will rotate continually until it reach to the location of sunrise direction, it were connected respectively in which the rotation arm sliding connector (73) connect with the rotation arm of sun location tracing (14b) push to sunset's direction by driving rod (72). Every the solar heat collector or photovoltaic collector (3a,3b,3n) and solar comparison heat collector (1) face to the sun by rotating sufficiently, all of system, the sun location trace collector (1a) of solar heat comparison collector (1) and the sun location trace control collector (1b) receive solar heat then the water (or liquid) of the heat collection water tubes (15a,15b) became steam by heating. During this process, the solar heat collector for returning to sunrise direction (2) to get out of the solar front gradually, on the other hand, the steam pressure brake (40) is unfastened and stops the sun location trace drive control turbine (46b) because of the steam from the solar heat collector for returning to sunrise direction (2) is reduced in there by the solar heat comparison collector moves to the solar front. In this time, the solar heat comparison collector (1) reaches the location to face the sun, so much steam generated from the sun location trace collector (1), this steam is supplied to the sun location trace drive turbine (46a) and increase rotation of the turbine. Also, the sun location trace control collector (1b) generate much more steam and this steam is supplied to the sun location trace drive control turbine (46b) for the turbine rotation. Here, the solar heat irradiation amount (S1) of the sun location trace collector (1a) is the same with the solar heat irradiation amount (S2) of sun location trace control collector (1b), the amount of the steam generated form each collectors (1a,1b) is almost the same (drawing 5). So, each rotational frequency of the sun location trace drive control turbine is almost the same with the sun location trace drive turbine, so the sprocket of differential gear is not almost working because of the difference of turns both of the turbine (46a, 46b) are near zero turns. After the solar moves a little to the sunset direction, much more steam product in the sun location trace collector (1a) and then the sun location trace drive turbine (46a) increases rotation frequency due to the sun location trace collector (1a) irradiation amount of the solar heat comparison collector (1) become greater than the sun location trace control collector (1b) irradiation amount (S2).

On the other hand, steam decreases at the sun location trace control collector (1b) and rotation number of the sun location trace drive control turbine (46b) decreases and the sprocket of differential gear (47) of the instrument of differential gear (4) rotates towards the same direction as the sun location trace drive turbine (46a) by the rotation number difference of two drive turbines (46a,46b) until solar radiation amount (S1) of the sun location trace collector (1a) and solar radiation amount (S2) the sun location trace control collector (1b) are parallel. The process performed until sunset (SS).

Figure 15:
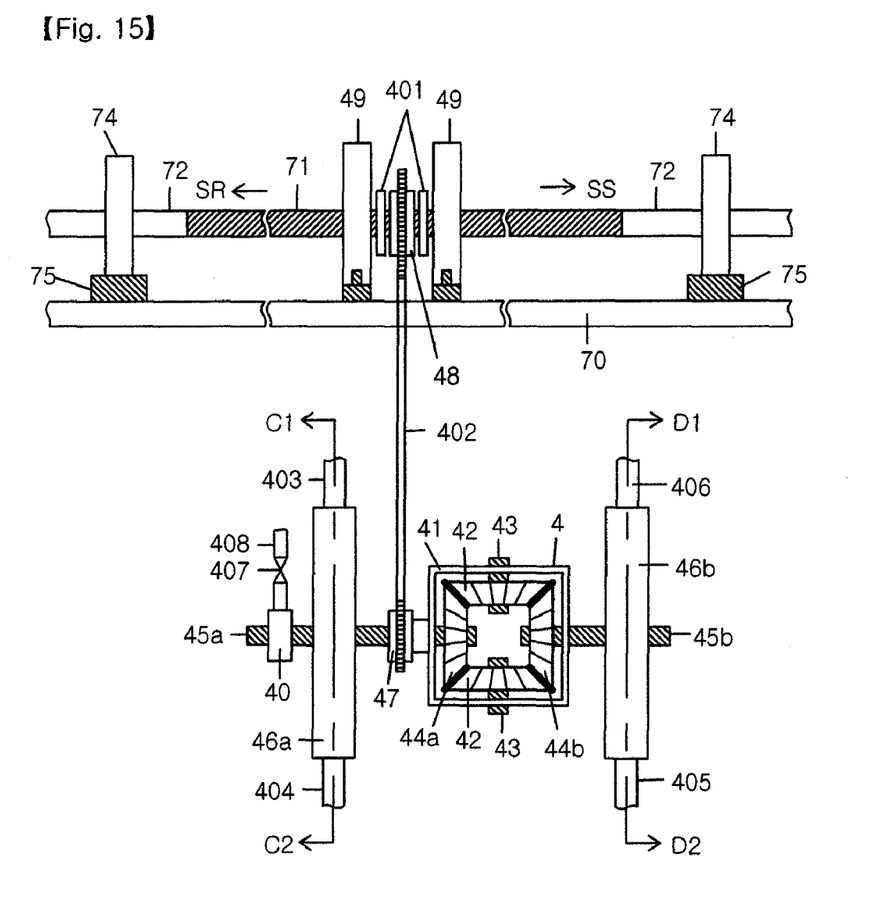
FIG. 15 is a drawing for the turbine driving system with the differential gear
Figure 16:
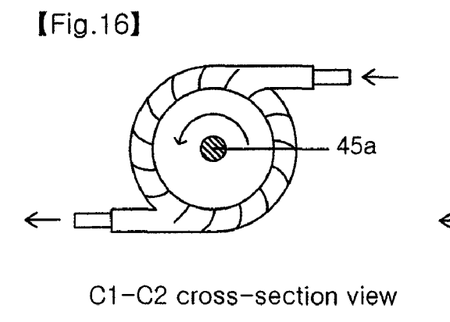
FIG. 16 is the cross-section view of the sun location trace drive turbine of the differential gear system (C1-C2)
Figure 17:
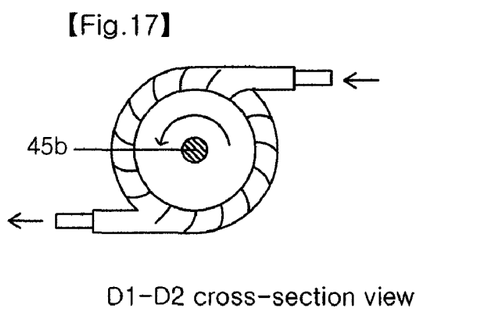
FIG. 17 is the cross-section view of the sun location trace control drive turbine of the differential gear system (D1-D2)
Figure 18:
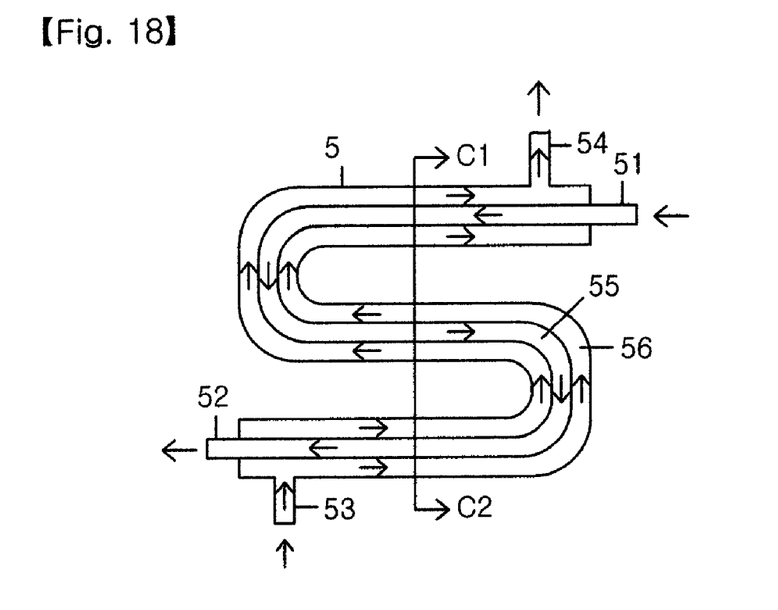
FIG. 18 is the inside cross-view of the double pipe heat exchanger
Figure 19:
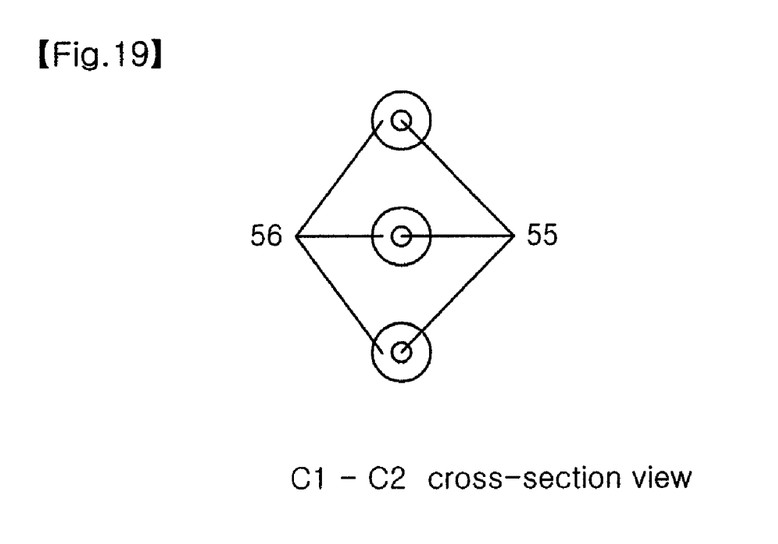
FIG. 19 is cross-section view of the double pipe heat exchanger (E1-E2)

At FIG. 15, the sliding ring (401) rotates easily without bias of the sprocket with female screw hole (48) and the movement screw guide ring (49) operates easily without any blocking at spiral part of driving rod (71) and driving rod guide ring (74) leads to stable movement of driving rod, and the rotation arm sliding nut (103) prevents rotation arm for sun location tracing (14b) from derailing the rotation arm sliding connector (73), and the rotation axis (102) and the rotation axis bearing (101) of the solar heat collector or photovoltaic collectors (3a,3b,3n) and the solar heat comparison collector (1) and the solar heat collector for returning to sunrise direction (2) to rotates easily.

When it needs to increase the sun location tracing sensitivity for the sun location tracking apparatus mentioned in above, expand the height of the solar ray reflection and blocking plane (11) which leads big difference of incident light area between the sun location trace collector (1a) and the sun location trace control collector (1b) just with a little change of sun location. In addition, when it requires to operate a number of solar heat or photovoltaic collectors, a great size of the solar heat comparison collector and solar heat collector for returning to sunrise direction location are required.

As mentioned above, the present invention causes solar heat collector or photovoltaic collectors to track sun location without electric power, and obtained more efficiency of the heat or light collection from solar heat or photovoltaic collectors, and decreases a facility cost of solar heat or photovoltaic collectors and thereby enhances the commercialization of solar energy.

The invention claimed is:

1. A solar tracking and energy collection apparatus comprising:
   a solar heat comparison collector (1) composed of a first solar tracking collector (1a) and a second solar tracking collector (1b) with the first solar tracking collector (1a) placed towards a sunset side and the second solar tracking collector (1b) placed towards a sunrise side, the first and second solar tracking collectors (1a, 1b) each having a parabolic reflector (18) of same size and coupled in parallel relation with each other;
   a heat collection tube (15a, 15b) installed in the first and second solar tracking collectors (1a, 1b) and containing a liquid filled in the tube (15a, 15b), the liquid adapted to change into gas by the solar energy from the first and second solar tracking collectors (1a, 1b), and thereby converting a thermal solar energy to a kinetic energy of the gas;
   a solar radiation reflection and blocking panel (11) placed at a joint area of the first and second solar tracking collectors (1a, 1b) and vertically against an upper aperture surface of the parabolic reflector (18) to differentiate a solar reception energy in the first and second solar tracking collectors (1a, 1b) depending upon the location of the sun;
   a first turbine (46a) coupled to the first solar tracking collector (1a) and with the heat collection tube (15a) connected between the first solar tracking collector (1a) and the first turbine (46a) to drive the first turbine (46a) by the kinetic energy of the gas;
   a second turbine (46b) coupled to the second solar tracking collector (1b) and with the heat collection tube (15b) connected between the second solar tracking collector (1b) and the second turbine (46b) to drive the second turbine (46b) by the kinetic energy of the gas; and
   a differential gear (4) having a first axle (45a) operatively coupled with the first turbine (46a) and a second axle (45b) operatively coupled with the second turbine (46b), to drive a driving rod (72) in a direction in response to said difference in the solar reception energy of the first and second solar tracking collectors (1a, 1b) and to direct the solar heat comparison collector (1) towards the sun.

2. The solar tracking and energy collection apparatus as claimed in claim 1, further comprising:
   a collector fixing member (14a) for fixing the first and second solar tracking collectors (1a, 1b) thereon; and
   a pivot arm (14b) extending vertically from a central portion of the collector fixing member (14a), the pivot arm configured to pivot in response to a horizontal movement of the driving rod (72) to rotate the solar heat comparison collector (1) about a pivot center.

3. The solar tracking and energy collection apparatus as claimed in claim 1, further comprising:
   at least one photovoltaic collector (3a, 3b, 3n) each coupled with the driving rod (72) to direct towards the sun;
   a solar heat collector (2) for returning the solar heat comparison collector (1) and the at least one photovoltaic collector (3a, 3b, 3n) to a sunrise direction, the solar heat collector (2) having a parabolic reflector, and a heat collection tube (15c) installed therein and containing a liquid filled in the tube (15c), the liquid adapted to change into gas by the solar energy from the solar heat collector (2), and thereby converting a thermal solar energy to a kinetic energy of the gas; and
   a liquid tank (6) and heat exchangers (5a, 5b) coupled with the heat collection tubes (15a, 15b, 15c).

4. The solar tracking and energy collection apparatus as claimed in claim 3, further comprising:
   a chain (402) coupled to the first axle (45a) of the differential gear (4) and the driving rod (72); and
   one or more check valves (104, 105, 106, 107, 205, 206, 407, 501, 502) for controlling the direction of liquid or gas flow in the tubes.

5. The solar tracking and energy collection apparatus as claimed in claim 4, further comprising a brake (40) coupled to the first axle (45a) of the differential gear (4).

* * * * *